Patented May 5, 1925.

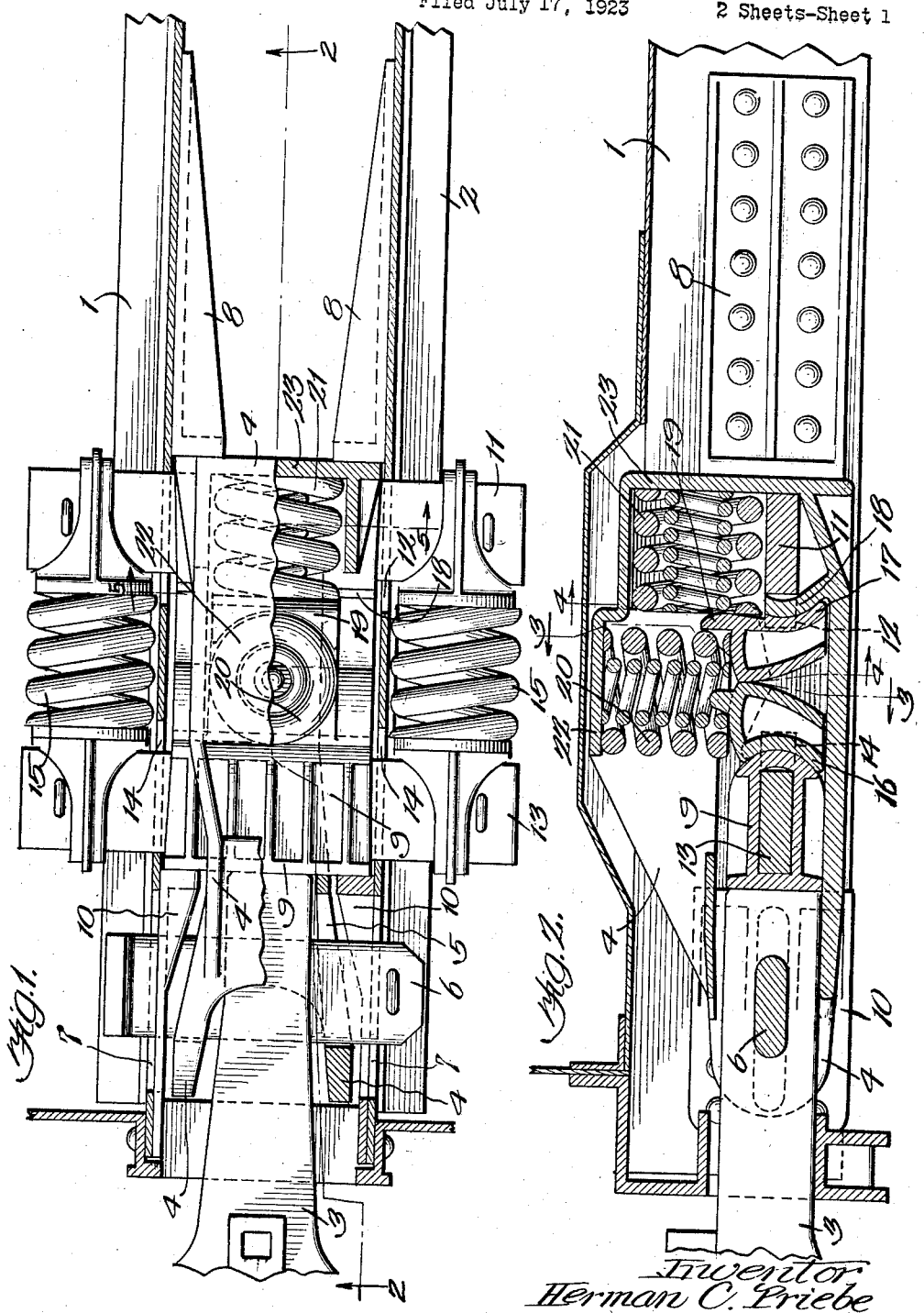

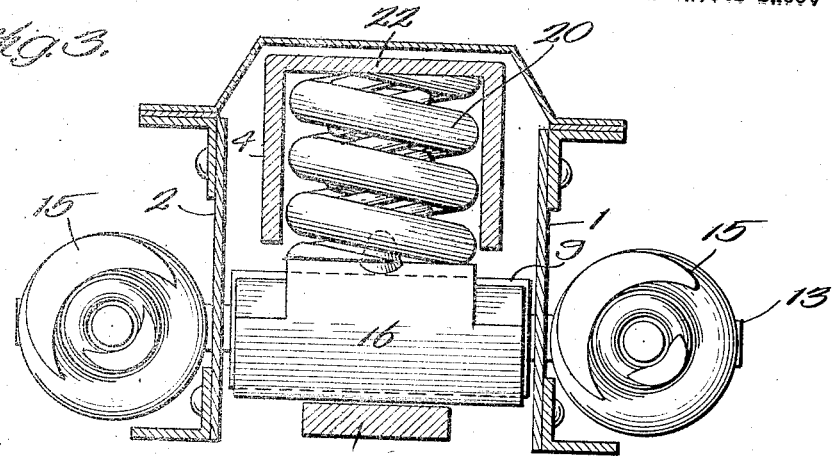
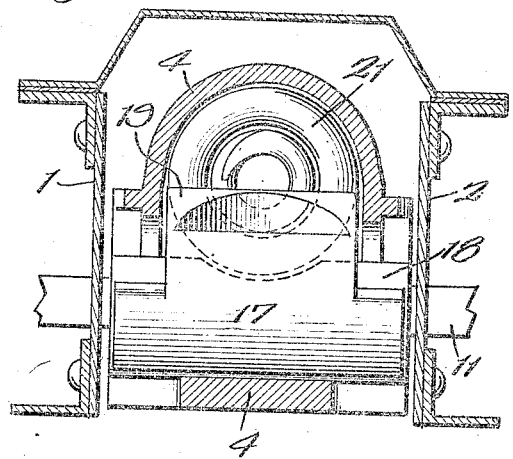
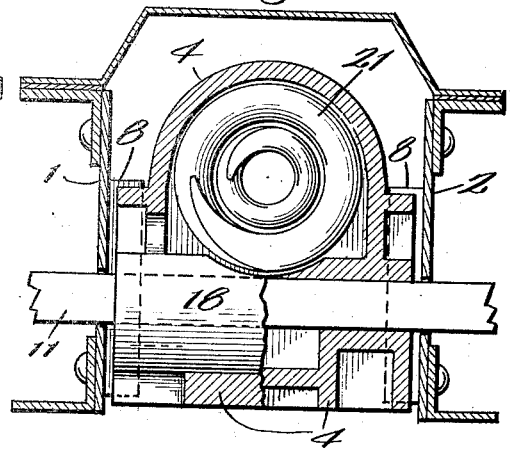
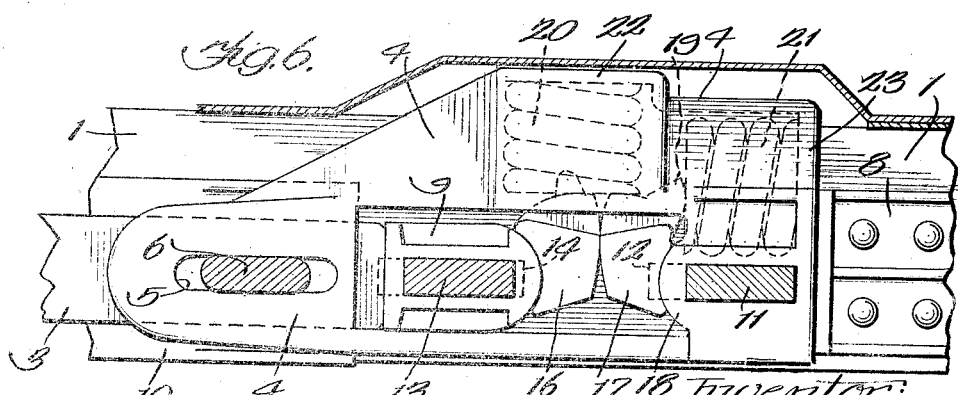

1,536,134

UNITED STATES PATENT OFFICE.

HERMAN C. PRIEBE, OF BLUE ISLAND, ILLINOIS.

DRAFT GEAR.

Application filed July 17, 1923. Serial No. 652,131.

*To all whom it may concern:*

Be it known that I, HERMAN C. PRIEBE, citizen of the United States, residing at Blue Island, in the county of Cook and State of Illinois, have invented a certain new and useful Improvement in Draft Gears, of which the following is a full, clear, concise, and exact description.

My invention relates to draft gears and has for its object the provision of improved shock absorbing mechanism.

The shock absorbing mechanism of my invention is suitably assembled with a coupler to be actuatable thereby and includes a yoke, shock absorbing mechanism with which the yoke is in actuating relation and having two portions movable in relatively angular directions and including a motion resistance device opposing movement of one of the shock absorbing mechanism portions and a second motion resisting device opposing movement of the other of said shock absorbing mechanism portions.

In the preferred embodiment of the invention the shock absorbing mechanism includes a rocker and the motion resisting devices are in the form of coiled springs one arranged along the draft sills and engageable by one portion of the rocker that is movable longitudinally of the gear, the other spring being arranged transversely of the sills and being engaged by another portion of the rocker that moves transversely of the sills. A second rocker is also desirably included that co-operates with the first and in such event there is a coupler operated follower individual to each of the rockers, one follower operating when the coupler is subject to sufficient pushing strains and the other follower being operated when the coupler is subject to sufficient pulling strains. The spring that is movable transversely of the sills is also desirably actuated by the second rocker. The abutments for the springs are desirably carried by the yoke whereby the draft gear is made largely self-contained, requiring only simple means to assemble it with the sills.

I will explain my invention more fully by reference to the accompanying drawings in which Fig. 1 is a plan view, partially in section, of a draft gear constructed in accordance with the preferred embodiment of the invention, parts being shown in section; Fig. 2 is a sectional view on line 2—2 of Fig. 1; Figs. 3 and 4 are sectional views taken respectively on lines 3—3 and 4—4 of Fig. 2; Fig 5 is a sectional view on line 5—5 of Fig. 1; and Fig. 6 is a longitudinal sectional view of a part of the structure illustrating a change in position of some of the parts.

Like parts are indicated by similar characters of reference throughout the different figures.

The center or other draft sills 1 and 2 are assembled in any suitable way with the body of the car. The draft gear of the invention is interposed between these sills. This draft gear includes a coupler having a stem 3 and a yoke 4. The stem is formed with a transverse horizontal key slot therethrough at the inner end thereof while the outer end of the yoke is formed with similar slots 5 which are aligned with the slot in the stem. A key 6 is passed through all of these slots which, with the exception of the slot in the stem, are all longer than the width of the key so that the key may move longitudinally of the yoke in the operation of the gear. This key also passes through slots 7 formed in the center sills, these slots being also longer that the width of the key to permit the key to move longitudinally of the sills.

Motion limiting draft lugs 8 are riveted to the inner upright sides of the center sills and are engaged by the inner end of the yoke. An outer follower 9 is surrounded or enclosed by the yoke and is engaged by the coupler butt to be moved inwardly thereby. Cheek plates 10 are at the forward end of the gear and are engaged by the follower 9 to limit the extent of the outward movement of this follower.

The gear is further assembled with the draft sills by means of a key 11 passing through slots 12 in the center sills and through a slot in the inner end of the coupler yoke. The slot in the coupler which receives the key 11 prevents material movement longitudinally of the gear between the gear and yoke but the slots 12 are longer than the width of this key to permit the key to move longitudinally of the sills. The key 13 also takes part in assembling the gear with the sills, this key passing through a slot in the outer follower 9 that snugly receives the same and passing through slots 14 in the center sills that are longer than the width of the key 13 to permit this key to move longitudinally of the sills. Springs 15 are upon the outer sides of the sills and between the outer ends of the keys 11 and 13, these springs pressing upon the follower 9 outwardly and away from the inner end of the coupler yoke. Two rockers 16, 17 are also surrounded by the yoke to begin the line of the draft. The outer rocker 16 has a curved outer face that is seated upon the curved inner end of the follower 9. The rocker 17 has a curved inner face that is seated upon the curved seat 18 formed integrally with the yoke. The rockers have opposed engaging or otherwise co-acting faces whereby each has turning action upon the other, the tops of the rockers moving transversely of the center sills or the axis of the draft gear, the inner rocker 17 having a nose extension 19 movable longitudinally of the gear. The motion resisting device, preferably in the form of a spring structure 20, is arranged transversely of the sills and the axis of the gear and engages the tops of the rockers so that upon pushing or pulling strains of sufficient magnitude the rockers press upon the springs transversely of the gear. Another motion resisting device, preferably in the form of a coiled spring structure 21, extends along the axis of the gear and is compressed longitudinally of the gear whenever the spring 20 is compressed transversely of the gear.

Each motion resisting device 20 and 21 operates in the line of movement of the portion of the shock absorbing mechanism which operates it, these motion resisting devices being in the nature of coiled springs, the axes thereof extending along the lines of movement of the portions of the shock absorbing mechanism which compress them. The abutments 22 and 23 against which the springs are pressed by the rockers are desirably carried by the yoke and are preferably integrally formed therewith. The coupler yoke is so shaped, in conjunction with the abutments 22, 23, as to form housings for the springs.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Shock absorbing mechanism for draft gears including two motion resisting devices and rocker mechanism including two co-acting rockers in the line of draft and positioned to transmit draft strains to both of said motion resisting devices, said rocker mechanism including two portions operating in relatively angular directions and respectively individual to said motion resisting devices and transmitting draft strains thereto.

2. Shock absorbing mechanism for draft gears including two motion resisting springs and rocker mechanism including two co-acting rockers in the line of draft and positioned to transmit draft strains to both of said motion resisting springs, said rocker mechanism including two portions operating in relatively angular directions and respectively individual to said motion resisting springs and transmitting draft strains thereto.

3. Shock absorbing mechanism for draft gears including two angularly related motion resisting devices and rocker mechanism including two coacting rockers in the line of draft and positioned to transmit draft strains to both of said motion resisting devices, said rocker mechanism including two portions operating in relatively angular directions and respectively individual to said motion resisting devices and transmitting draft strains thereto.

4. Shock absorbing mechanism for draft gears including two angularly related motion resisting springs and rocker mechanism including two coacting rockers in the line of draft and positioned to transmit draft strains to both of said motion resisting springs, said rocker mechanism including two portions operating in relatively angular directions and respectively individual to said motion resisting springs and transmitting draft strains thereto.

5. Shock absorbing mechanism for draft gears including two motion resisting devices and rocker mechanism including two coacting rockers in the line of draft and positioned to transmit draft strains to both of said motion resisting devices, said rocker mechanism including two portions operating in relatively angular directions and respectively individual to said motion resisting devices and transmitting draft strains thereto, the motion resisting devices operating in the lines of movement of said rocker mechanism portions respectively.

6. Shock absorbing mechanism for draft gears including two angularly related motion resisting coiled springs and rocker mechanism including two coacting rockers in the line of draft and positioned to transmit draft strains to both of said springs, said rocker mechanism including two portions individual to said coiled springs and imparting draft strains thereto and operating in the directions of the axes of said springs respectively.

7. Shock absorbing mechanism for draft gears including two motion resisting devices and rocker mechanism in the line of draft and positioned to transmit draft strains to both of said motion resisting devices, said rocker mechanism including two portions operating in relatively angular directions and respectively individual to said motion resisting devices and transmitting draft strains thereto.

In witness whereof, I hereunto subscribe my name this 21st day of June, A. D. 1923.

HERMAN C. PRIEBE.